(12) United States Patent
Miyamoto (10) Patent No.: US 7,380,952 B2
(45) Date of Patent: Jun. 3, 2008

(54) FRONT PANEL APPARATUS FOR ELECTRIC APPARATUS

(75) Inventor: Takashi Miyamoto, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 244 days.

(21) Appl. No.: 11/104,850

(22) Filed: Apr. 13, 2005

(65) Prior Publication Data
US 2005/0243468 A1   Nov. 3, 2005

(30) Foreign Application Priority Data
Apr. 13, 2004   (JP) ............................. 2004-117986

(51) Int. Cl.
*G01D 11/28* (2006.01)
(52) U.S. Cl. ............................ 362/26; 362/30; 362/85; 362/86
(58) Field of Classification Search ................. 362/23, 362/26, 30, 612, 29, 85–86, 295, 341, 348, 362/350
See application file for complete search history.

(56) References Cited

U.S. PATENT DOCUMENTS 4,630,177 A * 12/1986 Von Kohorn et al. ....... 362/551
5,764,391 A *  6/1998 Smith .......................... 359/34
6,003,206 A * 12/1999 Hall et al. ................... 16/441
6,192,774 B1 * 2/2001 Bauer et al. ................ 74/553
6,334,688 B1 * 1/2002 Niwa ........................... 362/26
7,059,735 B2 * 6/2006 Orikasa ....................... 362/23

FOREIGN PATENT DOCUMENTS

| JP | 3-20548 | 1/1991 |
| JP | 3-45385 | 2/1991 |
| JP | 3016827 | 7/1995 |
| JP | 9-35460 | 2/1997 |

OTHER PUBLICATIONS

Patent Abstracts of Japan, Publication No. 09-035460, Publication Date Feb. 7, 1997, 1 page.
Japanese Office Action for Japanese Application No. 2004-117986, mailed on Jul. 27, 2007, with English translation thereof (7 pages).

* cited by examiner

*Primary Examiner*—Sandra O'Shea
*Assistant Examiner*—Jason Moon Han
(74) *Attorney, Agent, or Firm*—Osha Liang LLP (57) ABSTRACT

In a front panel apparatus for an electric apparatus including a volume knob partially exposed outward from an operating port opened at a front panel of a casing of a disk drive, and a light emitting diode for emitting light based on a starting signal of the disk drive, the volume knob is molded by a light transmitting synthetic resin, the light emitting diode is arranged rearward from the volume knob, and light is made to be incident on the volume knob from the light emitting diode.

7 Claims, 6 Drawing Sheets

FRONT PANEL APPARATUS FOR ELECTRIC APPARATUS

BACKGROUND OF THE INVENTION

1. Field of the Invention

The present invention relates to a front panel apparatus used for an electric apparatus of, for example, a disk drive of DVD+RW or the like.

2. Description of the Related Art

Figure 6:
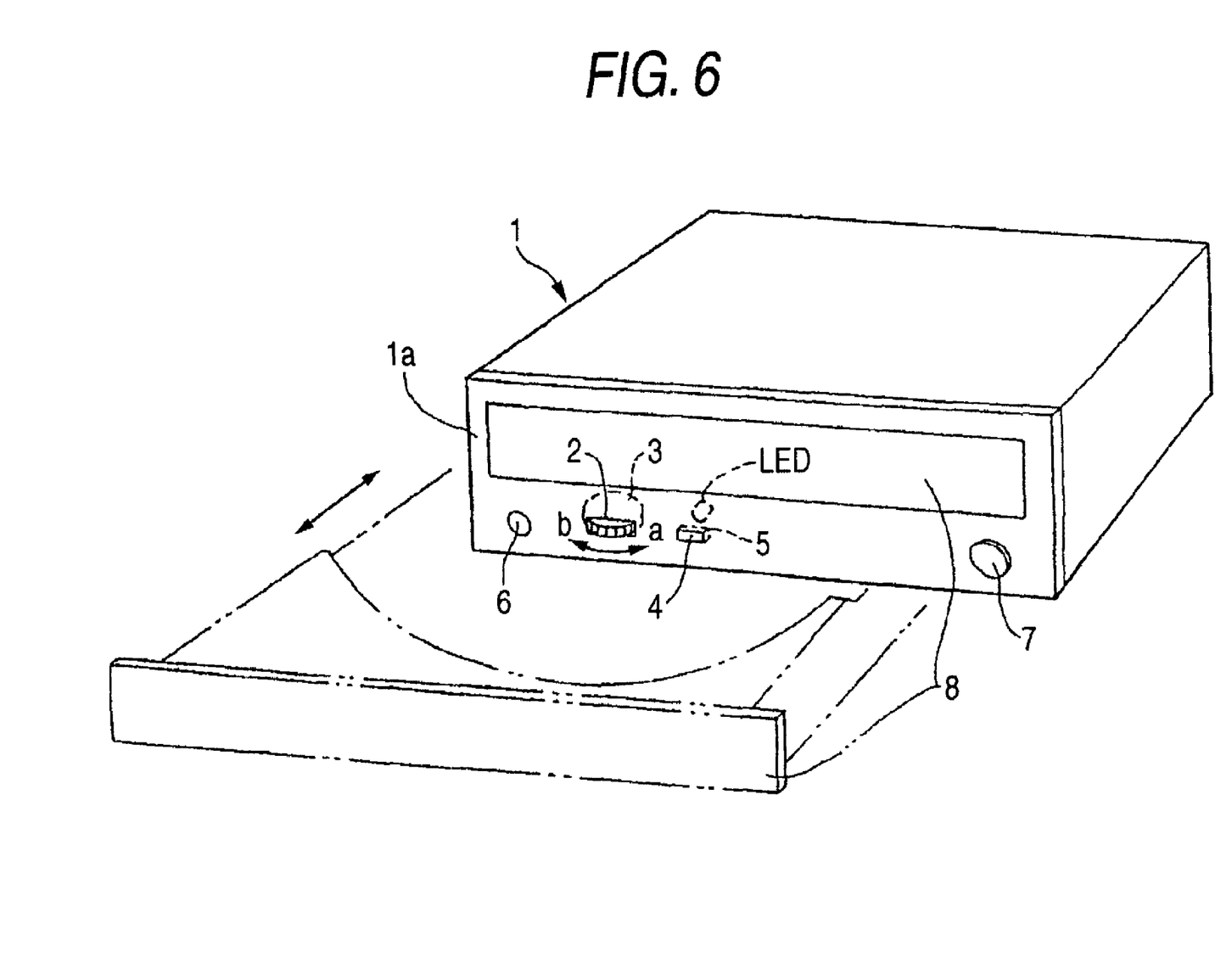
FIG. 6 is a perspective view showing a related art.

In a related art, there is an example of a disk drive of DVD+RW shown in FIG. 6. The example includes a volume knob 3 partially exposed outward from an operating port 2 opened at a front panel 1a of a casing 1, and a light emitting diode LED opposed to a display port 4 of the front panel 1a via a lens 5. Further, numeral 6 designates a jack for a headphone and numeral 7 designates a push button for extracting and retracting a tray 8.

Explaining an operating procedure, when a power source is connected to the disk drive to start, the light emitting diode LED is made to emit light based on a starting signal thereof, and the display port 4 is lighted via the lens 5. In the starting state, the tray 8 is unloaded (refer to an imaginary line of FIG. 6), a disk (not illustrated) is mounted onto the tray 8, thereafter, the push button 7 is depressed to load the tray 8 (refer to a bold line of FIG. 6), the disk on the tray 8 is rotated by a turn table, information recorded on the disk is read to reproduce by an optical pickup, an amount of reproduced sound thereof is adjusted to constitute a large sound amount by rotating the volume knob 3 in a left direction a or a small sound volume by rotating the volume knob 3 in a right direction b, and the controlled reproduced sound is heard by the headphone connected to the jack 6.

Although according to the above-described constitution of the related art, the starting state is displayed by lighting the display port 4 by making the light emitting diode LED emit light via the lens 5, according thereto, a number of parts is increased by an amount of using the lens 5, integrating operation is troublesome by taking time and labor in welding the lens 5 to the front panel 1a and manufacturing cost is expensive.

SUMMARY OF THE INVENTION

In view of the above-described drawback of the related art, it is an object of the invention to provide a front panel apparatus for an electric apparatus having a small number of parts and simplifying integrating operation.

In order to achieve the above-described object, according to a first aspect of the invention, there is provided a front panel apparatus for an electric apparatus including a volume knob partially exposed outward from an operating port opened at a front panel of a casing of a disk drive, and a light emitting diode opposed to a display port opened at the front panel via a lens for lighting the light emitting diode based on a starting signal, wherein the display port and the lens are omitted, the volume knob is molded by a light transmitting synthetic resin, the light emitting diode is arranged rearward from the volume knob, and light is made to be incident on the volume knob from the light emitting diode.

According to a second aspect of the invention, there is provided a front panel apparatus for an electric apparatus including a volume knob partially exposed outward from an operating port opened at a front panel of a casing of a disk drive, and a light emitting diode opposed to a display port opened at the front panel via a lens for lighting the light emitting diode based on a starting signal, wherein the display port and the lens are omitted, the volume knob is molded by a light transmitting synthetic resin, a ring-like projected portion is integrally formed with an upper face of the volume knob concentrically with the volume knob, the light emitting diode is inserted into the ring-like projected portion, and light is made to be incident on the volume knob from the light emitting diode.

According to a third aspect of the invention, there is provided a front panel apparatus for an electric apparatus including a volume knob partially exposed outward from an operating port opened at a front panel of a casing of a disk drive, and a light emitting diode opposed to a display port opened at the front panel via a lens for lighting the light emitting diode based on a starting signal, wherein the display port and the lens are omitted, the volume knob is molded by a light transmitting synthetic resin, a ring-like projected portion is integrally formed with an upper face of the volume knob concentrically with the volume knob, a reflecting face is formed by constituting an inner peripheral face of the ring-like projected portion by an inclined face converged to a depth side, the light emitting diode is arranged rearward from the ring-like projected portion, and light is made to be incident on the volume knob from the light emitting diode via the reflecting face.

According to a fourth aspect of the invention, there is provided a front panel apparatus for an electric apparatus including a volume knob partially exposed outward from an operating port opened at a front panel of a casing of a disk drive, and a light emitting diode opposed to a display port opened at the front panel via a lens for lighting the light emitting diode based on a starting signal, wherein the display port and the lens are omitted, the volume knob is molded by a light transmitting synthetic resin, a ring-like projected portion is integrally formed with an upper face of the volume knob concentrically with the volume knob, a reflecting face is formed by constituting an inner peripheral face of the ring-like projected portion by an inclined face converged to a depth side, the light emitting diode is arranged rearward from the ring-like projected portion, and light is made to be incident on the volume knob from the light emitting diode via the reflecting face by passing a light transmittancy control sheet.

According to a fifth aspect of the invention, there is provided a front panel apparatus for an electric apparatus including a volume knob partially exposed outward from an operating port opened at a front panel of a casing of an electric apparatus and a light emitting diode for emitting light based on a starting signal of the electric apparatus, wherein the volume knob is molded by a light transmitting synthetic resin, and light is made to be incident on the volume knob from the light emitting diode.

According to a sixth aspect of the invention in the fifth aspect of the invention, the light emitting diode is arranged rearward from the volume knob, and light is made to be incident on the volume knob from the light emitting diode.

According to a seventh aspect of the invention in the fifth aspect of the invention, a ring-like projected portion is integrally formed with an upper face of the volume knob concentrically with the volume knob, the light emitting diode is inserted into the ring-like projected portion, and light is made to be incident on the volume knob from the light emitting diode.

According to a eighth aspect of the invention in the fifth aspect of the invention, a ring-like projected portion is integrally formed with an upper face of the volume knob concentrically with the volume knob, a reflecting face is formed by constituting an inner peripheral face of the ring-like projected portion by an inclined face converged to a depth side, the light emitting diode is arranged rearward from the ring-like projected portion, and light is made to be incident on the volume knob from the light emitting diode via the reflecting face.

According to a ninth aspect of the invention in the fifth aspect of the invention, a ring-like projected portion is integrally formed with an upper face of the volume knob concentrically with the volume knob, a reflecting face is formed by constituting an inner peripheral face of the ring-like projected portion by an inclined face converged to a depth side, an outer peripheral face of the ring-like projected portion is wound with a light transmittancy control sheet molded by a light transmitting synthetic resin a light transmittancy of which is gradually changed from one end portion thereof to other end portion thereof, the light emitting diode is arranged rearward from the ring-like projected portion, and light is made to be incident on the volume knob from the light emitting diode via the reflecting face bypassing the light transmittancy control sheet.

According to the first aspect of the invention, the starting state is displayed by lighting the volume knob by making the light emitting diode emit light, the volume knob serves also as the lens of the related art and therefore, a number of parts is reduced by an amount of serving as the lens of the related art, further, lens welding operation which has been needed in the related art can also be saved and therefore, also a number of integrating steps is reduced, fabricating cost becomes inexpensive, and an inexpensive disk drive can be provided.

Further, since the volume knob is lighted, the volume can easily be controlled by optically observing a position of the volume knob clearly even in a dark place.

Here, particularly, in view of design, a position of the light emitting diode may be changed from a rear side of the lens of the related art to a rear side of the volume knob and the position can easily be changed.

According to the second aspect of the invention, an effect substantially similar to that of the first aspect of the invention can be achieved, particularly, since the light emitting diode is inserted into the ring-like projected portion integrally formed with the upper face of the volume knob, the starting state can clearly be displayed by brightly lighting directly the volume knob.

According to the third aspect of the invention, an effect substantially similar to that of the first aspect of the invention can be achieved, particularly, since light is made to be incident on the volume knob from the light emitting diode via the reflecting face, the starting state can clearly be displayed by brightly lighting the volume knob.

According to the fourth aspect of the invention, an effect substantially similar to that of the first aspect of the invention can be achieved, particularly, since light is made to be incident on the volume knob from the light emitting diode via the reflecting face by passing the light transmittancy control sheet, the starting state can clearly be displayed by brightly lighting the volume knob, further, the volume control (for example, sound amount) can be confirmed by optical observation by a brightness controlled by the light transmittancy control sheet.

According to the fifth aspect of the invention, the starting state is displayed by lighting the volume knob by making the light emitting diode emit light, the volume knob serves also as the lens of the related art and therefore, a number of parts is reduced by an amount of serving as the lens of the related art, further, lens welding operation which has been needed in the related art can be saved and therefore, a number of integrating steps is also reduced and fabricating cost becomes inexpensive.

Further, since the volume knob is lighted, the volume can easily be controlled by optically observing a position of the volume knob clearly even in a dark place.

According to the sixth aspect of the invention, in view of design, a position of the light emitting diode may only be changed from a rear side of the lens of the related art to a rear side of the volume knob and the position can easily be changed.

According to the seventh aspect of the invention, the light emitting diode is inserted into the ring-like projected portion integrally formed with the upper face of the volume knob and therefore, the starting state can clearly be displayed by brightly lighting directly the volume knob.

According to the eighth aspect of the invention, light is made to be incident on the volume knob from the light emitting diode via the reflecting face and therefore, the starting state can clearly be displayed by brightly lighting the volume knob.

According to the ninth aspect of the invention, since light is made to be incident on the volume knob from the light emitting diode via the reflecting face by passing the light transmittancy control sheet, the starting state can clearly be displayed by brightly lighting the volume knob, further, the volume control (for example, sound amount) can be confirmed by optical observation by a brightness controlled by the light transmittancy control sheet.

BRIEF DESCRIPTION OF THE DRAWINGS

These and other objects and advantages of this invention will become more fully apparent from the following detailed description taken with the accompanying drawings in which.

DETAILED DESCRIPTION OF THE PREFERRED EMBODIMENTS

Figure 1A:
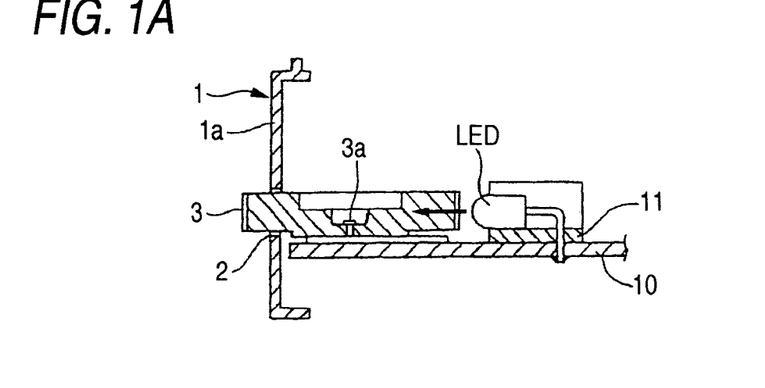
FIG. 1A is a vertical sectional view showing a first embodiment of the invention.
Figure 1B:
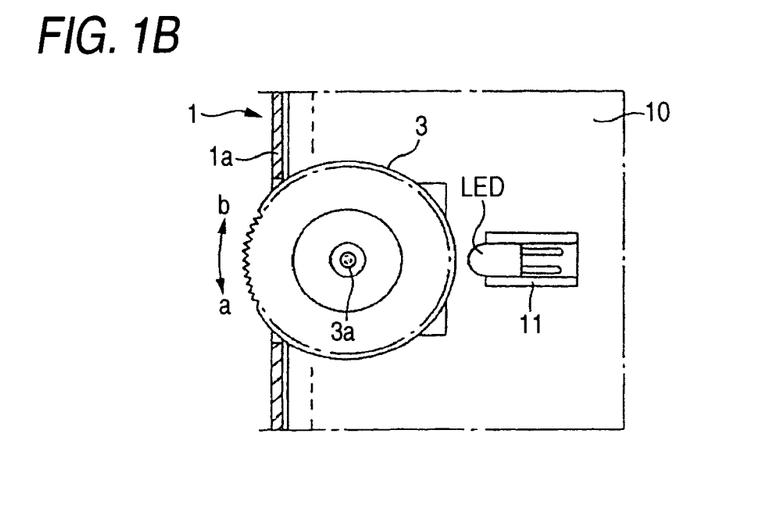
FIG. 1B is a plane view thereof.
Figure 1C:
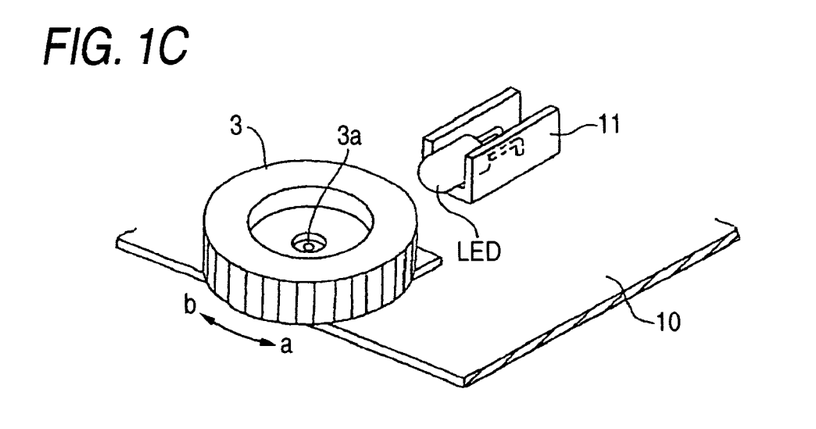
FIG. 1C is a perspective view of an essential portion thereof.

FIGS. 1A to 1C show a front panel apparatus for a disk drive according to a first embodiment, a volume knob 3 rotated regularly and reversely in the left and right directions a, b around a supporting shaft 3a arranged on a printed board 10 is molded by a light transmitting synthetic resin of acrylic resin or the like, a light emitting diode LED is arranged above the printed board 10 rearward from the volume knob 3 via a holder 11, and the display port 4 and the lens 5 shown in FIG. 6 are omitted. A constitution other than the above-described is substantially the same as the constitution shown in FIG. 6 and therefore, the same portion is attached with the same notations and an explanation thereof will be omitted.

Explaining an operating procedure, when a power source is connected to the disk drive to start, the light emitting diode LED is made to emit light based on a starting signal thereof, the light is made to be incident on the volume knob 3 to light the volume knob 3. According to a procedure thereafter, similar to that of the related art, the push button 7 is depressed to unload the tray 8 (refer to the imaginary line of FIG. 6), a disk (not illustrated) is mounted onto the tray 8, thereafter, the push button 7 is depressed to load the tray 8 (refer to the bold line of FIG. 6), the disk on the tray 8 is rotated by a turntable, information recorded in the disk is read to reproduce by an optical pickup, an amount of reproduced sound thereof is controlled to constitute a large sound amount by rotating the volume knob 3 in the left direction a or constituting a small sound volume by rotating the volume 3 in the right direction b and the controlled reproduced sound is heard by a headphone connected to the jack 6.

According to the above-described constitution, the starting state is displayed by lighting the volume knob 3 by making the light emitting diode LED emit light, the volume knob 3 serves also as the lens 5 of the related art (refer to FIG. 6) and therefore, a number of parts is reduced by an amount of serving as the lens 5, further, lens welding operation which has been needed in the related art can be saved and therefore, also a number of integrating steps is reduced, fabricating cost becomes inexpensive, and an inexpensive disk drive can be provided.

Further, since the volume knob 3 is lighted, the volume can easily be controlled by optically observing a position of the volume knob 3 clearly even in a dark place.

Here, particularly, in view of design, the position of the light emitting diode LED is only changed from a rear side of the lens 5 to a rear side of the volume knob 3 and the position can easily be changed.

Figure 2A:
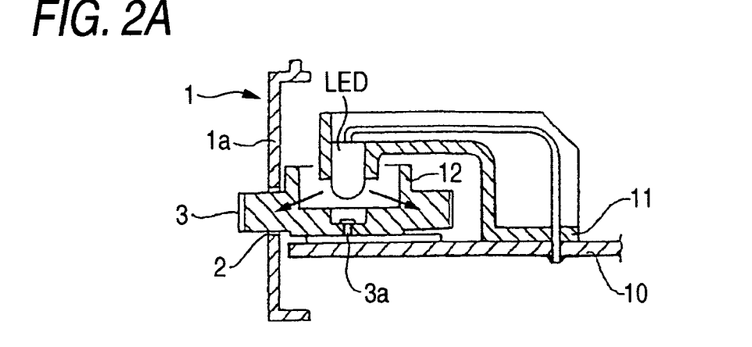
FIG. 2A is a vertical sectional view showing a second embodiment of the invention.
Figure 2B:
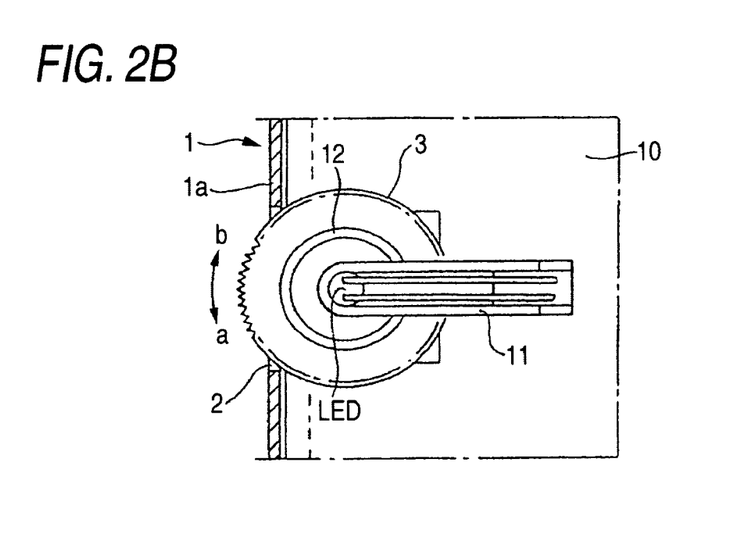
FIG. 2B is a plane view thereof.
Figure 2C:
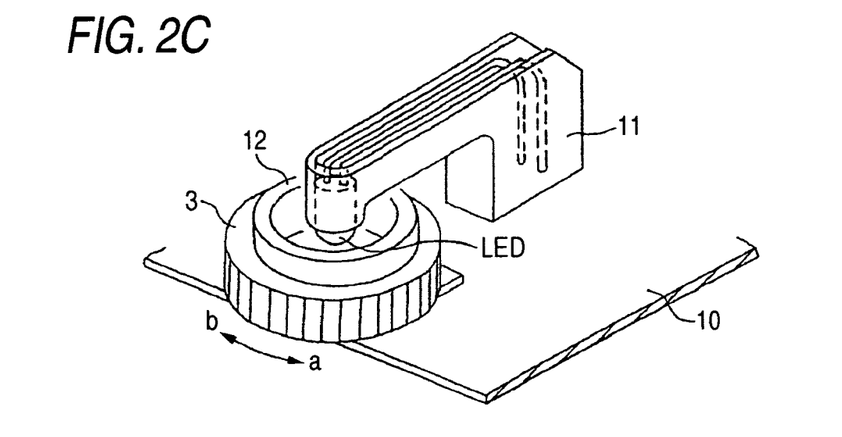
FIG. 2C is a perspective view of an essential portion thereof.

FIGS. 2A to 2C show a second embodiment of the invention, a ring-like projected portion 12 is integrally formed with an upper face of the volume knob 3 concentrically with the volume knob 3, the light emitting diode LED is inserted into the ring-like projected portion 12 and light is made to be incident on the volume knob 3 from the light emitting diode LED. A constitution other than the above-described is substantially the same as that of the first embodiment (refer to FIGS. 1A to 1C) and therefore, the same portions are attached with the same notations and an explanation thereof will be omitted.

According to the above-described constitution, an effect substantially similar to that of the first embodiment can be achieved, particularly, since the light emitting diode LED is inserted into the ring-like projected portion 12 integrally formed with the upper face of the volume knob 3, the starting state can clearly be displayed by lighting the volume knob 3 directly and brightly.

Figure 3A:
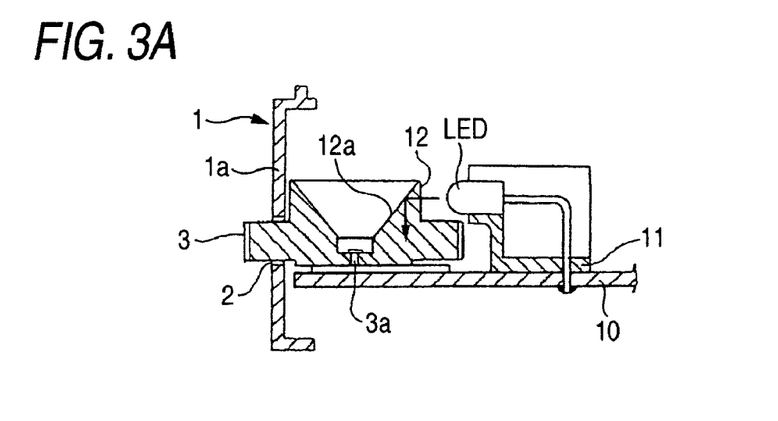
FIG. 3A is a vertical sectional view showing a third embodiment of the invention.
Figure 3B:
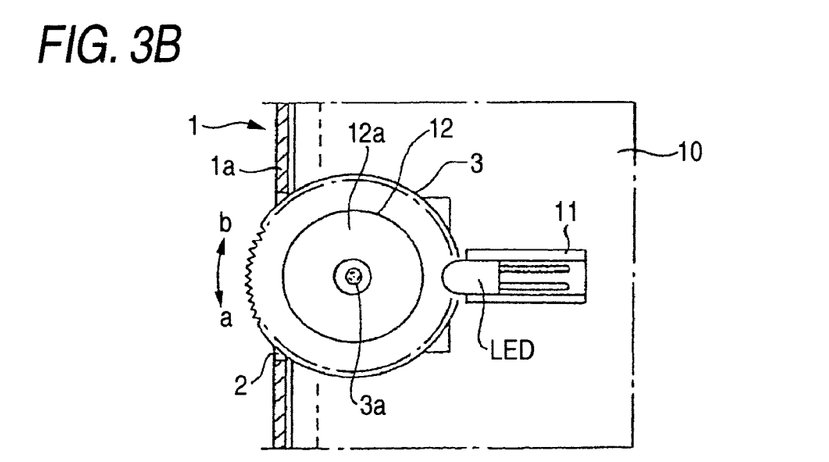
FIG. 3B is a plane view thereof.
Figure 3C:
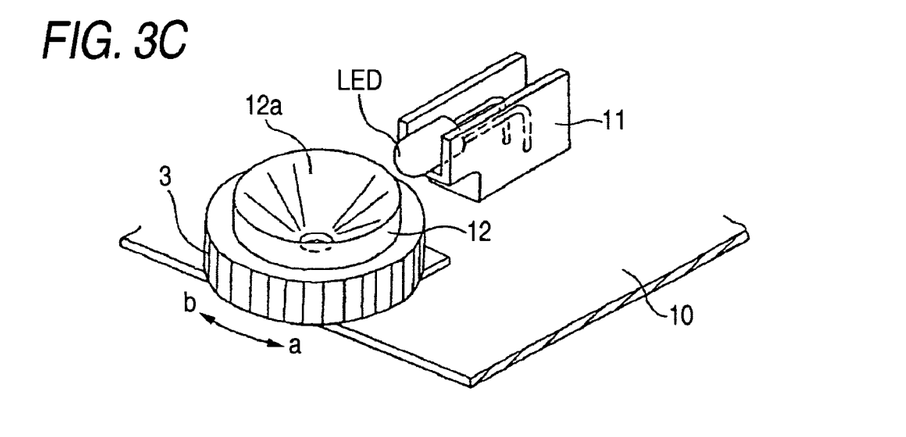
FIG. 3C is a perspective view of an essential portion thereof.
Figure 4A:
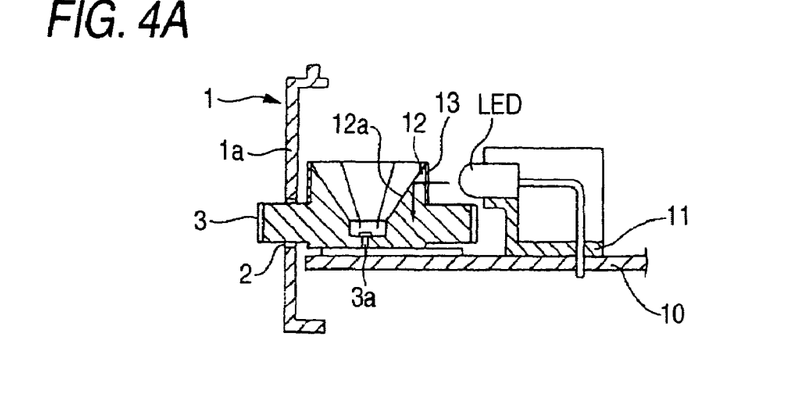
FIG. 4A is a vertical sectional view showing a fourth embodiment of the invention.
Figure 4B:
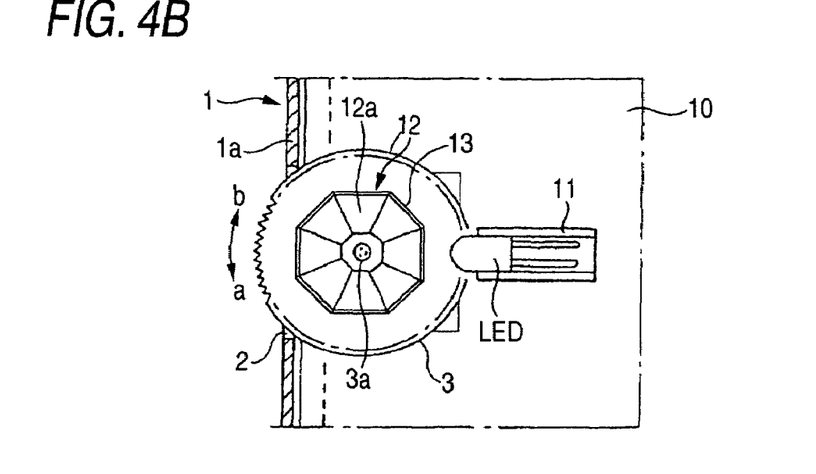
FIG. 4B is a plane view thereof.
Figure 4C:
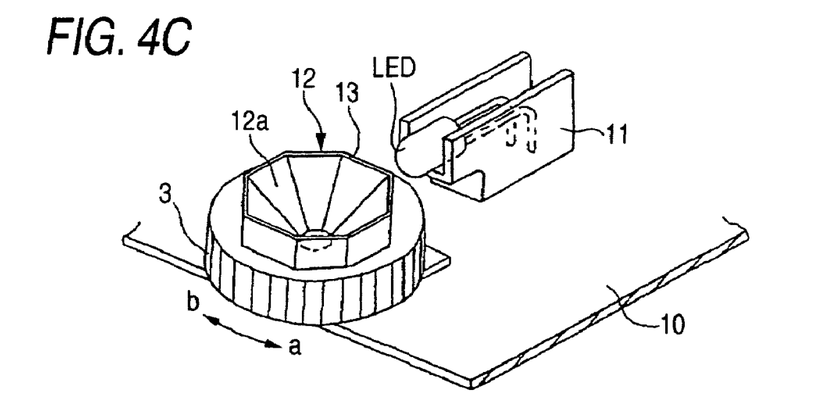
FIG. 4C is a perspective view of an essential portion thereof.
Figure 5:
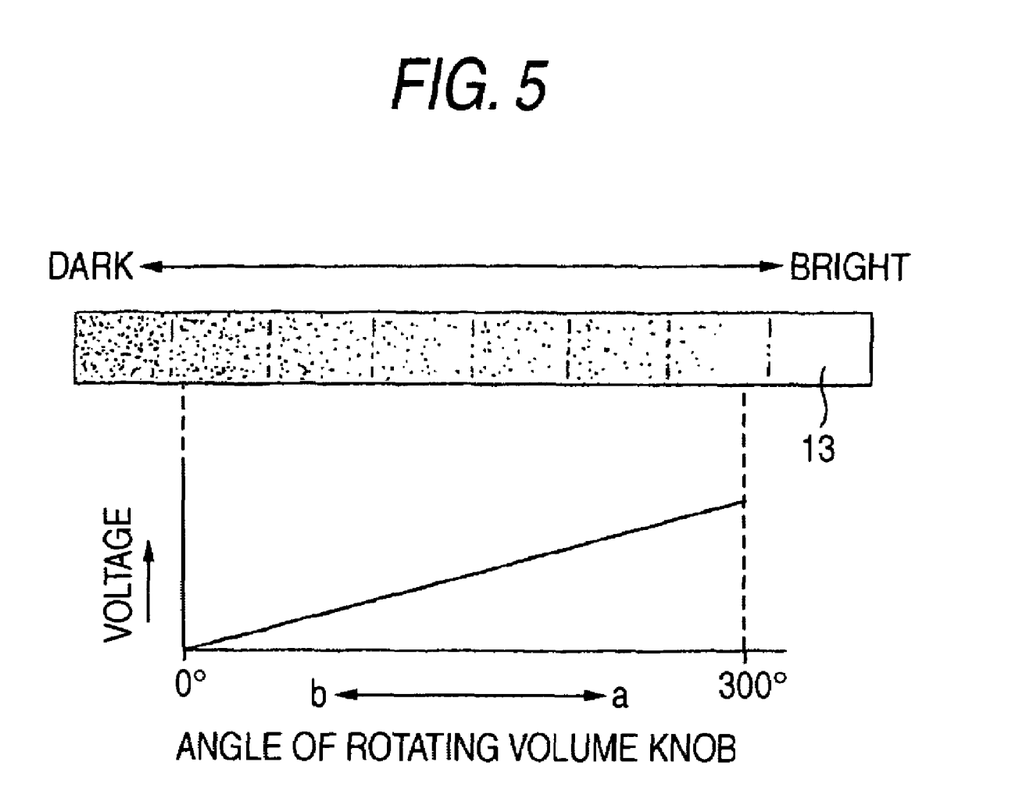
FIG. 5 is an explanatory view showing a relationship between a light transmittancy control sheet and a volume knob 3 thereof.

FIGS. 3A to 3C show a third embodiment of the invention, a reflecting face 12a is formed by constituting an inner peripheral face of the ring-like projected portion 12 in a circular shape integrally formed with the upper face of the volume knob 3 by an inclined face converged to the depth side, the light emitting diode LED is arranged on a rear side of the ring-like projected portion 12, and the light is made to be incident on the volume knob 3 from the light emitting diode LED via the reflecting face 12a. A constitution other than the above-described is substantially the same as that of the first embodiment (refer to FIGS. 1A to 1C) and therefore, the same portions are attached with the same notations and an explanation thereof will be omitted.

According to the above-described constitution, an effect substantially similar to that of the first embodiment can be achieved, particularly, the light is incident on the volume knob 3 from the light emitting diode LED via the reflecting face 12a and therefore, the starting state can clearly be displayed by brightly lighting the volume knob 3.

FIGS. 4A to 4C and FIG. 5 show a fourth embodiment of the invention, the upper face of the volume knob 3 is integrally formed with the ring-like projected portion 12 in a [polygonal shape (hexagonal shape, octagonal shape or polygonal shape having more angles) or circular shape] concentrically with the volume 3, the reflecting face 12a is formed by constituting the inner peripheral face of the ring-like projected portion 12 by the inclined face converged to the depth side, in accordance with an angle of rotating the volume knob 3 (0° through 300°), an outer peripheral face of the ring-like projected portion 12 is wound with a light transmittancy control sheet 13 molded by a light transmitting synthetic resin, a transmittancy of which is gradually changed from one end portion thereof over to other end portion thereof to be thermally welded by hot stamping, the light emitting diode LED is arranged on the rear side of the ring-like projected portion 12, light is made to be incident on the volume knob 3 from the light emitting diode LED via the reflecting face 12a bypassing the light transmittancy control sheet 13. A constitution other than the above-described is substantially the same as that of the first embodiment (refer to FIGS. 1A to 1C) and therefore, the same portions are attached with the same notations and an explanation thereof will be omitted.

According to the above-described constitution, an effect substantially similar to that of the first embodiment can be achieved, particularly, light is made to be incident on the volume knob 3 from the light emitting diode LED via the reflecting face 12a by passing the light transmittancy control sheet 13 and therefore, the starting state can clearly be displayed by brightly lighting the volume knob 3, further, the volume control (for example, sound amount) can be recognized by optical observation by a brightness controlled by the light transmittancy control sheet 13.

Although in the above-described embodiments, an explanation has been given by taking an example of the disk drive, the invention is not limited thereto but is applicable also to various electric apparatus including the volume knob and the light emitting diode.

What is claimed is:

1. A front panel apparatus for an electric apparatus comprising:

a knob partially exposed outward from an operating port opened at a front panel of a casing of the electric apparatus, comprised of a light transmitting synthetic resin, and rotatable around a center point thereof in a first direction;

a light emitting diode operable to emit light based on a signal of the electric apparatus;

a ring-like projected portion is integrally formed with an upper face of the knob concentrically with the knob; and an inner peripheral face of the ring-like projected portion comprises an inclined reflecting face converging in a downward direction, wherein:

the light emitting diode is disposed on a line passing through the center point of the knob and perpendicular to the first direction, the light emitting diode is arranged rearward from the ring-like projected portion, and light is made to be incident on the knob from the light emitting diode via the reflecting face.

2. The front panel apparatus according to claim 1, wherein:

the light emitting diode is arranged rearward from the knob.

3. The front panel apparatus according to claim 1, wherein:

the light emitting diode is inserted into the ring-like projected portion.

4. A front panel apparatus for an electric apparatus comprising:

a knob partially exposed outward from an operating port opened at a front panel of a casing of the electric apparatus, comprised of a light transmitting synthetic resin, and rotatable around a center point thereof in a first direction;

a light emitting diode operable to emit light based on a signal of the electric apparatus;

a ring-like projected portion is integrally formed with an upper face of the knob concentrically with the knob;

an inner peripheral face of the ring-like projected portion comprises an inclined reflecting face converging in a downward direction;

an outer peripheral face of the ring-like projected portion is wound with a light transmittancy control sheet molded by a light transmitting synthetic resin, a light transmittancy of which is gradually changed from one end portion thereof to other end portion thereof;

wherein:

the light emitting diode is disposed on a line passing through the center point of the knob and perpendicular to the first direction, the light emitting diode is arranged rearward from the ring-like projected portion, and light is made to be incident on the knob from the light emitting diode via the reflecting face by passing the light transmittancy control sheet.

5. The front panel apparatus according to claim 4, wherein the light emitting diode is arranged rearward from the knob.

6. The front panel apparatus according to claim 4, wherein the light emitting diode is inserted into the ring-like projected portion.

7. A front panel apparatus for an electric apparatus comprising:

a volume knob partially exposed outward from an operating port opened at a front panel of a casing of a disk drive and rotatable relative to the front panel; and a light emitting diode for emitting light based on a starting signal of the electric apparatus, wherein:

the volume knob is molded by a light transmitting synthetic resin;

a ring-like projected portion is integrally formed with an upper face of the volume knob concentrically with the volume knob;

the light emitting diode is inserted into the ring-like projected portion; and light is made to be incident on the volume knob from the light emitting diode.

* * * * *